(12) United States Patent
Dai et al.

(10) Patent No.: US 11,533,266 B2
(45) Date of Patent: Dec. 20, 2022

(54) RATE ADJUSTMENT TECHNIQUES

(71) Applicant: ZTE Corporation, Guangdong (CN)

(72) Inventors: Qian Dai, Guangdong (CN); He Huang, Guangdong (CN); Fei Dong, Guangdong (CN); Zijiang Ma, Guangdong (CN); Jianxun Ai, Guangdong (CN)

(73) Assignee: ZTE Corporation, Guangdong (CN)

( * ) Notice: Subject to any disclaimer, the term of this patent is extended or adjusted under 35 U.S.C. 154(b) by 139 days.

(21) Appl. No.: 17/123,803

(22) Filed: Dec. 16, 2020

(65) Prior Publication Data

US 2021/0105216 A1 Apr. 8, 2021

Related U.S. Application Data

(63) Continuation of application No. PCT/CN2018/092254, filed on Jun. 21, 2018.

(51) Int. Cl.
*H04L 12/825* (2013.01)
*H04L 47/25* (2022.01)
*H04W 28/02* (2009.01)

(52) U.S. Cl.
CPC ......... *H04L 47/25* (2013.01); *H04W 28/0268* (2013.01)

(58) Field of Classification Search
CPC ..... H04L 47/25; H04L 1/203; H04L 25/0262; H04L 47/263; H04W 28/0268; H04W 28/22; H04W 28/0257
See application file for complete search history.

(56) References Cited

U.S. PATENT DOCUMENTS

| | | | | |
|---|---|---|---|---|
| 2011/0170408 A1* | 7/2011 | Furbeck | ................. | H04L 47/12 370/230 |
| 2011/0170410 A1* | 7/2011 | Zhao | ...................... | H04W 8/04 370/232 |
| 2013/0194937 A1* | 8/2013 | Sridhar | ................. | H04W 28/10 370/252 |
| 2014/0105041 A1* | 4/2014 | Swaminathan | ....... | H04L 1/0002 370/252 |
| 2014/0359082 A1 | 12/2014 | Paris et al. | | |
| 2017/0332282 A1* | 11/2017 | Dao | ..................... | H04L 1/0026 |

(Continued)

FOREIGN PATENT DOCUMENTS

| | | |
|---|---|---|
| CN | 106134130 A | 11/2016 |
| CN | 107135502 A | 9/2017 |
| WO | 2014/154263 A1 | 10/2014 |

(Continued)

OTHER PUBLICATIONS

Office Action for Chinese Patent Application No. 2018800904750, dated Aug. 31, 2021, with unofficial translation, 22 pages.

(Continued)

*Primary Examiner* — Mewale A Ambaye
(74) *Attorney, Agent, or Firm* — Perkins Coie LLP

(57) ABSTRACT

The disclosed techniques enable communication nodes to perform rate adjustments. As an example, a communication node may receive a control information from a network node. Based on the received control information, the control node may determine that the network node supports codec adaptation or that the communication node is allowed to enable the codec adaptation.

20 Claims, 11 Drawing Sheets

```
┌─────────────────────────────────────────┐
│   Receiving a control information       │── 1602
└─────────────────────────────────────────┘
                    │
                    ▼
┌─────────────────────────────────────────┐
│  Determining that a network node        │
│  supports codec adaptation or that a    │── 1604
│  communication node is allowed to       │
│  enable codec adaptation                │
└─────────────────────────────────────────┘
```

(56) References Cited

U.S. PATENT DOCUMENTS

2019/0261007 A1* 8/2019 Emmanuel ............ H04L 1/0014

FOREIGN PATENT DOCUMENTS

| WO | 2017196248 A1 | 11/2017 |
| WO | 2018085668 A1 | 5/2018 |

OTHER PUBLICATIONS

Huawei et al., "Delay budget report and MAC CE adaptation for NR for TS 38.300", 3GPP TSG-WG2 Meeting #102 R2-1809242, May 21-25, 2018, 5 pages.
International Search Report and Written Opinion, PCT/CN2018/092254 dated Feb. 27, 2019, 8 pages.

* cited by examiner

RATE ADJUSTMENT TECHNIQUES

CROSS REFERENCE TO RELATED APPLICATIONS

This patent document is a continuation of and claims benefit of priority to International Patent Application No. PCT/CN2018/092254, filed on Jun. 21, 2018. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed to enable bit rate adjustment between communication nodes. In a first example aspect, a method of wireless communication is disclosed. The method includes, receiving, by a communication node from a network node, a control information, and determining, based on the control information, that the network node supports codec adaptation or that the communication node is allowed to enable the codec adaptation. In some embodiments, the control information includes information that indicates that the codec adaptation is enabled or disabled per transmission direction, per one or more packet data unit (PDU) sessions, per one or more quality of service (QoS) flow, per one or more data radio bearer (DRB), or per one or more logical channels (LCH).

In some embodiments, the method of the first example aspect includes generating, by the communication node, a recommended bit rate query by excluding one or more PDU sessions, one or more QoS flow, one or more DRB, or one or more LCH that cannot perform codec adaptation.

In some embodiments, the control information includes information that indicates a bit rate adjustment range for the codec adaptation. In some embodiments, the communication node generates a recommended bit rate query by including a bit rate that does not exceed the bit rate adjustment range.

In some embodiments, the control information includes information that indicates that a time window for codec adaptation is supported or not supported by the network node. In some embodiments, the control information includes information that indicates that a time window of the codec adaptation is enabled or disabled for the communication node.

In some embodiments, the method of the first example aspect includes in response to determining, based on the received control information, that the network node does not support codec adaptation or that the communication node is not allowed to enable the codec adaptation, performing any one or more of following operations: determining that a recommended bit rate query not be sent to the network node, and determining that a recommended bit rate query not be generated.

In a second example aspect, a method of wireless communication is disclosed. The method includes sending, by a first network element to a second network element, a message that includes adaptation control information including an indication of the second network element being enabled or disabled for codec adaptation or the second network element being allowed to enable codec adaptation for a communication node, and wherein the first and second network elements are separate network elements.

In some embodiments, the message includes information that indicates that the codec adaptation is enabled or disabled per transmission direction for the second network element or per transmission direction for the communication node. In some embodiments, the message includes information that indicates that the codec adaptation is to be enabled or disabled per one or more packet data unit (PDU) session, per one or more quality of service (QoS) flow, per one or more data radio bearer (DRB), or per one or more logical channels (LCH). In some embodiments, the message includes information that indicates a target code rate or a target code rate range of any one or more of per communication node, per one or more PDU sessions, per one or more Qos flow, per one or more DRB, or per one or more LCH. In some embodiments, the message includes information that indicates a time window within which codec adaption is to be enabled or disabled.

In some embodiments of the second example aspect, the first network element includes a Centralized Unit and the second network element includes a Distributed Unit. In some embodiments of the second example aspect, the first network element includes a master node and the second network element includes a secondary node.

In a third example aspect, a method of wireless communication is disclosed. The method includes sending, by a first network element to a second network element, a request message, wherein the request message informs the second network element to enable or disable codec adaptation, and wherein the first and second network elements are separate network elements. In some embodiments, the first network node sends to the second network node an indication that that first network node implemented codec adaption for a communication node.

In some embodiments, the request message includes information that indicates that the codec adaptation is to be enabled or disabled per transmission direction for the first network element or per transmission direction for a communication node. In some embodiments, the request message includes information that indicates that the codec adaptation is enabled or disabled per one or more packet data unit (PDU) session, per one or more quality of service (QoS) flow, per one or more data radio bearer (DRB), or per one or more logical channels (LCH). In some embodiments, the request message includes information that indicates a target code rate or a target code rate range of any one or more of per communication node, per one or more PDU sessions, per one or more Qos flow, per one or more DRB, or per one or more LCH. In some embodiments, the request message includes information that indicates a time window within which codec adaption is to be enabled or disabled.

In some embodiments of the third example aspect, the method further includes receiving, by the first network element from a communication node, a recommended bit rate query that includes a recommended bit rate, wherein the request message includes information that indicates that the first network element supports the recommended bit rate. In some embodiments of the third example aspect, the method includes sending, by the first network element to the second network element, the recommended bit rate. In some embodiments of the third example aspect, the first network element includes a Distributed Unit and the second network element includes a Centralized Unit.

In a fourth example aspect, a method of wireless communication is disclosed. The method includes receiving by a network node a service type information of a codec adaptation of a communication node, wherein the network node receives the service type information from the communication node or from a core network. In some embodiments, the core network is configured to provide the service type information to the communication node. In some embodiments, the service type information includes information that identifies one or more packet data unit (PDU) sessions or one or more quality of service (QoS) flow that support codec adaptation. In some embodiments, the service type information includes a bit rate adjustment range of codec adaptation supported by a packet data unit (PDU) session or a quality of service (QoS) flow.

In a fifth example aspect, a method of wireless communication is disclosed. The method includes receiving, by a first network element from a second network element, a plurality of priorities of coverage enhancements that includes a priority of a codec adaptation relative to one or more priorities of one or more other coverage enhancements, and wherein the first and second network elements are separate network elements. In some embodiments of the fifth example aspect, the first network element includes a Distributed Unit and the second network element includes a Centralized Unit. In some embodiments of the fifth example aspect, the first network element includes a user equipment and the second network element includes a Radio Access Network (RAN) node.

In a sixth example aspect, a method of wireless communication is disclosed. The method includes sending, by a first network element to a second network element, information that includes a recommended bit rate information generated for or sent to a user equipment, or a recommended bit rate query information received by the first network element from the user equipment, wherein the user equipment is to be handed over. In some embodiments, the first network element includes a source gNB and a second network element includes a target gNB.

In some embodiments of the various aspects, the first network element includes a secondary node and the second network element includes a master node. In some embodiments of the various aspects, the communication node includes a user equipment and the network node includes a Radio Access Network (RAN) node.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

This patent document first provides an overview of the 5G Radio Access Network (RAN). Next, this patent document discusses some of the issues associated with the current application layer rate adjustment process for multimedia telephone service (MMtel). Thereafter, the patent document describes various solutions in six sections. At least some of the solutions for Section 1 generally relate to enabling control mechanism between network node, such as a RAN node, and a communication node, such as a UE. At least some of the solutions for Section 2 generally relate to enabling control mechanism between a first network element, such as a Distributed Unit (DU), and a second network element, such as a Centralized Unit (CU) where the DU and CU are separate. At least some of the solutions for Section 3 generally relate to enabling control mechanism between a first network node, such as a RAN node and a core network. At least some of the solutions for Section 4 generally relate to prioritized control information sent between network elements or network nodes. At least some of the solutions for Section 5 generally relate to a handover process. At least some of the solutions for Section 6 generally relate to enabling control mechanism between a master node and a secondary node. The example headings for the various sections below are used to facilitate the understanding of the disclosed subject matter and do not limit the scope of the claimed subject matter in any way. Accordingly, one or more features of one example section can be combined with one or more features of another example section.

The 5G New Radio (NR) protocol has introduced a dual connectivity system that may include simultaneous connection of two 5G-NR base stations by the UE, or simultaneous connection of one LTE base station and one 5G-NR base station by the UE. Currently, while the 5G-NR is being developed, there is a need for an application layer bit rate adjustment process because of issues with network coverage or Radio Access Network (RAN) congestion. As further explained in the various embodiments in this patent document, the development of the bit rate adjustment process can include a single-link rate-adjusted wireless handshake process, a bit rate adjustment method of secondary node (SN) or master node (MN) in inter-node dual connection (DC), and a code rate adjustment method of intra-centralized unit (CU), inter-distributed unit (DU) DC, SN or MN.

Section headings are used in the present document to improve readability and do not limit the embodiments and techniques described in a section to that section only.

General Architecture of 5G Radio Access Network (RAN)

Figure 1:
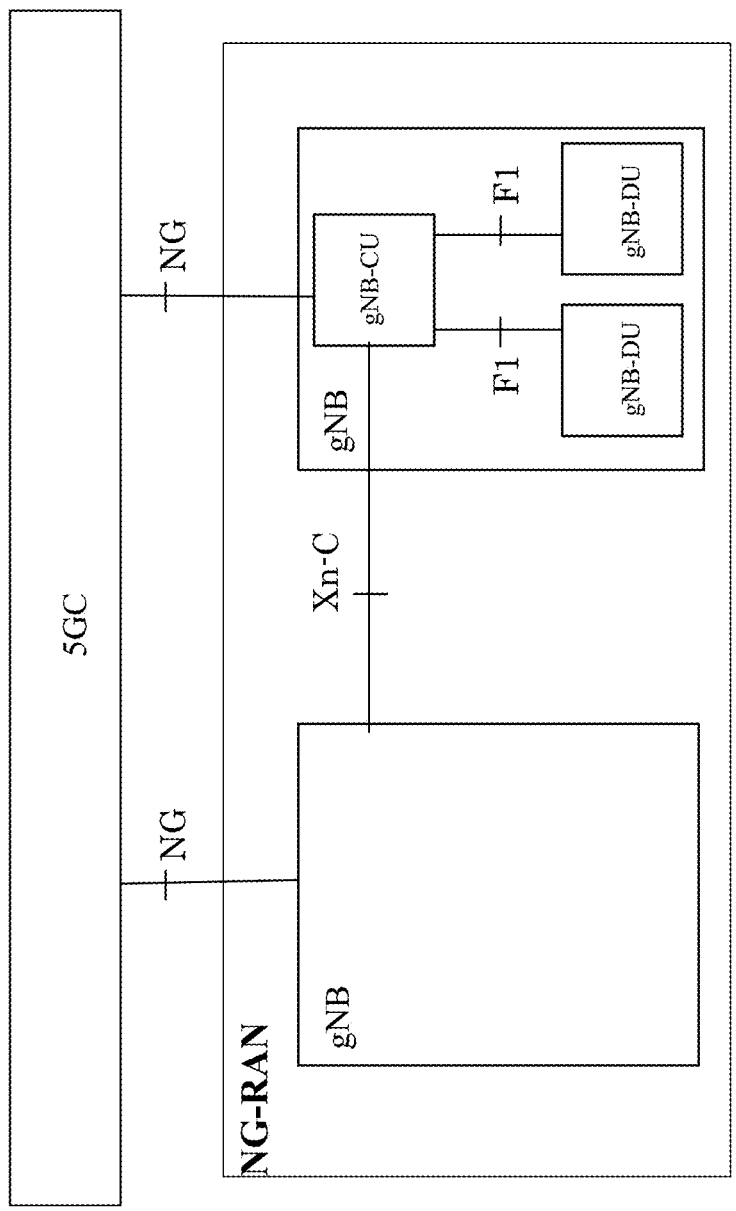
FIG. 1 shows an example of a general architecture of a 5G RAN.

FIG. 1 shows an example of a general architecture of a 5G RAN. On top of FIG. 1, the acronym 5GC refers to a core network of the 5G network. The bottom half of FIG. 1 shows a NG RAN, which is referred to as the 5G New Radio Access Technology (RAT) Radio Access Network. The NG-RAN consists of a set of one or more gNBs connected to the 5GC through the NG interface. The gNB is the base station of the 5G RAN. A gNB can support frequency division duplex (FDD) mode, time division duplex (TDD) mode, or dual connectivity mode operations. The set of gNBs can be interconnected through the Xn interface. A gNB may consist of a gNB-CU and one or more gNB-DU(s). A gNB-CU and a gNB-DU is connected via F1 interface. NG, Xn and F1 are logical interfaces used in the network.

In the New Radio (NR) framework, the forward network interface can be divided by considering transmission capacity, transmission delay, and/or ease of deployment. For example, considering non-ideal forward transmission, the delay-insensitive network function can be placed on a network element such as in a Centralized Unit (CU) and a delay-sensitive network function can be placed on another network element, such as a Distributed Unit (DU).

In FIG. 1, the left gNB is not split into CU and DU, whereas the right gNB is split into CU and DU. This decision whether to split the gNB can be based on an operator's network deployment requirements. An example of the division of CU and DU functions in the protocol stack is that the CU can include Radio Resource Control (RRC) and Packet Data Convergence Protocol (PDCP) functions and the DU can include RLC, MAC, and PHY functions.

Figure 2:
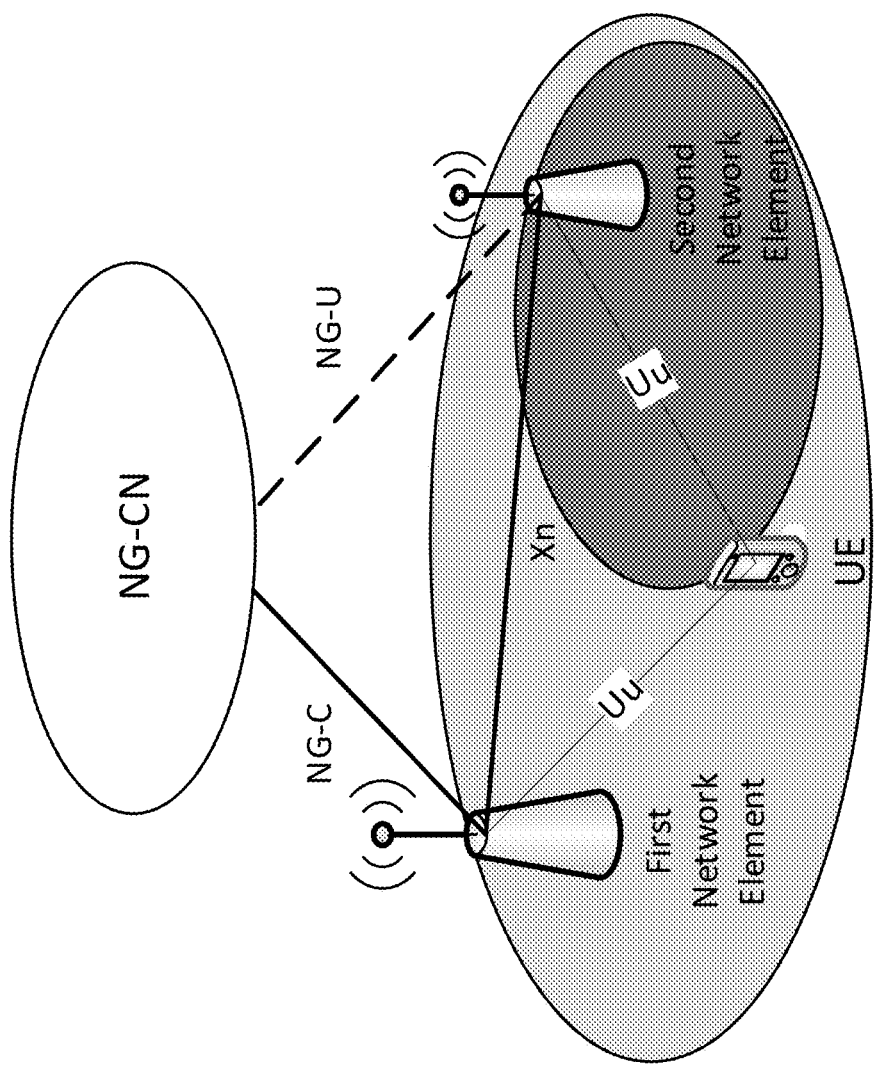
FIG. 2 shows an example of a dual-connectivity (DC) architecture of the New Radio (NR) system.

FIG. 2 shows an example of a dual-connectivity (DC) architecture of the NR system. A DC system may include two (or more) network-side nodes that provide data connectivity to or from UEs. For example, the network nodes may include master and secondary nodes. As another example, the network nodes in a DC system may include an eNB and a gNB or other types of serving network nodes that provide wireless connectivity to UEs. In the DC system, for a UE having a multiple transceiver (multiple Rx/Tx), the current serving base station, such as a first network element in FIG. 2, of the UE in the NG-RAN may select a suitable wireless channel for the UE. For example, the first network element can select a wireless channel having a quality that meets or exceeds a certain threshold. In the DC system, a second base station, such as a second network element in FIG. 2 can also be added to the UE. In the DC system, the two base stations can jointly provide radio resources for the UE to perform user plane data transmission. Further, in terms of a wired interface, a first NG control plane (NG-C) can be established between the first network element and the Next Generation Core Network (NG-CN), and at most a NG-U can be established between the second network element and the NG-CN for the UE. The first network element and the second network element may be connected by an ideal or non-ideal interface called an Xn interface.

In terms of a wireless interface, the first network element and the second network element may provide the same or different Radio Access Technology (RAT), and relatively independent scheduling of UEs. Among them, the first network element connected to the control plane of the core network can be referred to as a master node, and the core network can have only the user plane connection even if there may be no user plane connection with the core network in some cases. The second network element can be referred to as a secondary node. If there are more than two network elements connected to the UE, all nodes except the master node are called secondary nodes.

Based on the above described dual-connectivity concept, the multi-RAT dual connection refers to a dual connectivity architecture where the master node and the secondary node can be access points of different radio access technologies. For example, one access point can be a NR RAN node (e.g., gNB) and another access point can be an LTE RAN node (eNB). In this example, the eNB and the gNB can be connected to a 5G core network at the same time. In another example, a dual connectivity scenario can include both the primary node and the secondary node as NR RAN nodes (e.g., gNB).

Application Layer Rate Adjustment

Multimedia telephone service (MMtel) includes voice and video services according to different communication needs. MMtel can provide an end-to-end voice and video services between a first network node, such as a first UE, and a second network node, such as a second UE or a computer. The application layer of the network nodes has a variety of code rates that are optional so that both network nodes can use the code rate to negotiate at the software application layer. When the communication environment becomes worse or better, the network nodes can negotiate down or increase the application layer code rate. However, because the code rate for application layer negotiation may not necessarily match the actual communication environment of the network, it may conflict with the actual needs of the network. For example, there may be several reasons why a voice or video session may be stuck. Some of the reasons may include degradation of the wireless environment, or congestion at the RAN or the core network.

Moreover, the function of the bit rate adjustment and the existing coverage enhancement functions of various other access networks are duplicated in effect. For example, a duplication may include among others PDCP duplication, overlap enhancement mechanism of sub-frames at the physical layer, or dual connection mechanism. If the UE application layer arbitrarily adjusts the application layer code rate, it may cause the RAN's wireless interface efficiency to decrease. Therefore, the control mechanism of the application layer code rate adjustment should be considered at the RAN level.

1. Control Mechanism Between UE and RAN for Codec Adaptation

Section 1 provides solutions for enabling control mechanism for codec adaptation at the network side wireless interface between a network node, such as a RAN node, and a communication node, such as a UE.

Solution 1.1: UE Receives Information from RAN Node:

The UE can obtain one of the following codec adaptation control information from the RAN node: (1) whether or not the RAN node supports codec adaptation, or (2) whether the UE is allowed to enable the codec adaptation function. Information about whether the RAN node supports codec adaptation can be obtained through system messages. Information about whether the UE is allowed to enable the codec adaptation function can be obtained through dedicated signaling or Medium Access Control Control Element (MAC CE).

In some embodiments, the codec adaptation control information obtained by the UE from the RAN node may include whether or not RAN node can provide recommended bit rate which may not meet the Qos requirement of the UE in case a RAN node supports codec adaptation or in case the UE is allowed to enable the codec adaptation function. Some examples of recommended bit rate not meeting the Qos requirement may include the UE receiving from the RAN node a recommended bit rate of a bearer or a Qos flow or a LCH that is lower than the guaranteed bit rate (GBR) requirement of the bearer, or Qos flow or LCH, or the UE receiving from the RAN node a recommended bit rate of a bearer or a Qos flow that is higher than the maximum bit rate (MBR) requirement of the bearer or Qos flow or LCH.

In some embodiments, the codec adaptation control information obtained by the UE from the RAN node may tell the UE whether or not the UE is allowed to send a codec adaptation bit rate query to the RAN node in some cases. For example, the codec adaptation control information may inform the UE that the UE can send to the RAN node a codec adaptation or recommended bit rate query that may not meet the Qos requirements of one or more bearers. Another example may be that the UE can send to the RAN node a codec adaptation bit rate query that is not able to meet Qos flows or LCHs of the UE.

In some embodiments where the UE connected with a master node or a secondary node at the same time, the UE can obtain codec adaptation control information from the master node, which includes whether UE is allowed to perform codec adaptation with the secondary node. If the UE is not allowed to perform codec adaptation with the secondary node, UE may not generate a recommended bit rate query for the secondary node or send recommended bit rate query to the secondary node.

In some embodiments, the codec adaptation control information obtained by the UE from the RAN node may include fine-grained control information, including whether the codec adaptation is enabled or disabled for any one or more of the following: per direction (e.g., uplink or downlink), per one or more packet data unit (PDU) sessions, per one or more quality of service (QoS) flow, per one or more data radio bearer (DRB), or per one or more logical channel (LCH). In some embodiments, the fine-grained control information for codec adaptation can include a bit rate adjustment range for codec adaptation.

Further, the control information acquired by the UE from the RAN node may optionally include additional information such as information indicative of time window of RAN node supporting codec adaptation, or time window of enabling/disabling codec adaptation for the UE. For example, this information indicates when and for how long the RAN node supports codec adaptation, or the UE is enabled/disabled codec adaptation.

In some embodiments, if the RAN node does not support codec adaptation, or the RAN node does not allow the UE to enable codec adaptation, the UE may perform any one or more of the following: (1) the UE may not send a recommended bit rate query to the RAN node if the recommended bit rate query has been generated, and (2) the UE may not generate a recommended bit rate query to send to the RAN node.

The UE sends the recommended bit rate query to the RAN node to provide the RAN node with a certain code rate recommendation value of the logical channel. Thus, the UE can use the recommended bit rate query to determine whether the RAN node can provide the code rate recommendation value, or the UE requests a RAN node to indicate the code rate recommendation value determined by the RAN node.

In some embodiments where a UE is in communication with another communication node, such as another UE or a multimedia Gateway (MGW), the first UE can notify another communication node about the RAN node's codec adaptation control information. In such embodiments, the notification method may include the UE using higher layers to send the control information to the network node. For example, the UE may use non-access stratum (NAS) layer signaling, the UE may forward the control information to another communication node through the core network, or the UE may send the control information to the another communication node through the application layer.

In some embodiments, if the information acquired by the UE from the RAN node indicates that the RAN node supports (or does not support) codec adaptation, or indicates that the time window for enabling or disabling the UE's codec adaptation function, then UE can perform the operations described in Section 1.1 within the time window.

In some embodiments where the UE control information includes fine-grained control information for codec adaptation, as described above, then the UE can perform any one or more of the following operations: (1) when generating the recommended bit rate query, the UE may not include the one or more PDU sessions, one or more QoS flow, one or more DRB, or one or more LCH that cannot perform codec adaptation, and/or (2) when the UE generates a recommended bit rate query, it may not exceed the bit rate adjustment range indicated by RAN node, such as a gNB.

Example 1 for Solution 1.1

Figure 3:
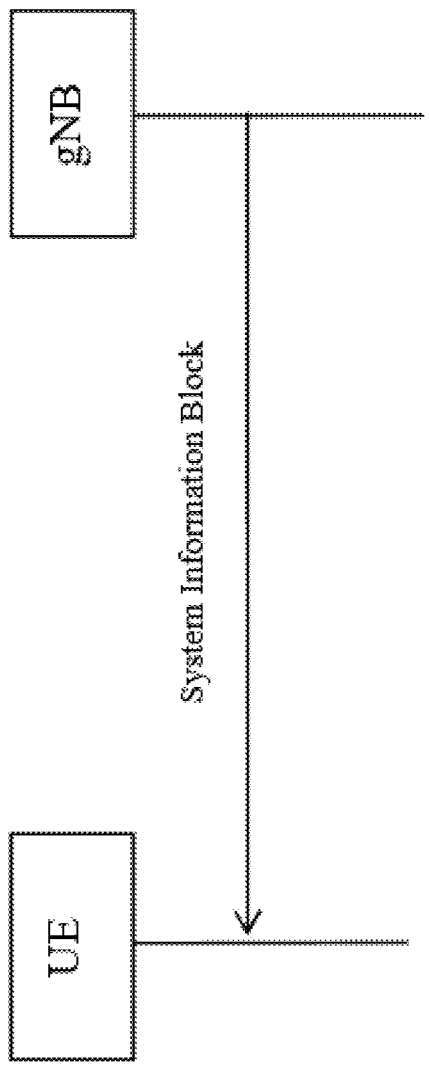
FIG. 3 shows an example of a user equipment (UE) receiving a codec adaptation control information from a Radio Access Network (RAN) node.

FIG. 3 shows an example of a UE receiving a codec adaptation control information from a RAN node. The RAN node, such as a gNB may use a system message such as a system information block to broadcast the codec adaptation control information to one or more UEs in a coverage area of the gNB. The system information block may include the codec adaptation control information. The codec adaptation control information can indicate to the UE whether the codec adaptation function is supported.

In some embodiments, if the UE knows that the gNB supports the codec adaptation function, whether in the RRC idle state or in the RRC connected state, the UE may perform the following actions: (1) If a codec adjustment request is obtained from the peer UE or peer Media GateWay (MGW), the UE can generate a recommended bit rate query and send it to the gNB, asking the gNB whether it can provide the codec adjustment bit rate included in the query; or (2) If the UE measures that the quality of the air interface does not meet the preset threshold, the UE can generate a bit rate query and send it to the gNB, and ask the gNB if it can provide the gNB indicated codec adjustment bit rate.

In some embodiments, if the UE determines from the system information that the gNB does not support the codec adaptation function, the UE may perform the following actions: (1) The UE may not send a recommended bit rate query to the RAN node if the recommended bit rate query has been generated; or (2) The UE does not generate a recommended bit rate query for the corresponding RAN node.

Optionally, the UE can notify a second communication node, such as another user equipment or an MGW, of the acquired RAN node's codec adaptation control information. In this patent document, the UE and the second communication node may be communicating with each other. For example, the UE and the second communication node may be engaged in a voice or video session. The UE may inform the second communication node using a route that may pass through the application layer or through a NAS message. For example, the UE may send a NAS message including the acquired RAN node's codec adaptation control information to the core network and the core network forwards it to the second communication node.

The codec adaptation control information sent by the gNB through a system message may have fine-grained control information that may include: (1) per direction (e.g., whether uplink codec adaptation is supported and/or whether downlink codec adaptation is supported); (2) codec adaptation bit rate adjustment range; and/or (3) codec adaptation control time window. Based on finer-grained control, the UE's behavior rules may include: (1) If the information acquired by the UE from the RAN node further includes a time window of the RAN node with information indicating a support or lack of support for codec adaptation, or a time window within which UE's codec adaptation function is enabled or disabled, then the UE can implement any one or more of the operations described above in Example 1 for Solution 1.1.

Further, if the information acquired by the UE from the RAN node is fine-grained control information for codec adaptation, for example, if one or more PDU sessions indicating that codec adaptation cannot be performed are indicated in the control information of the codec adaptation, or Qos flow, Or DRB, or LCH, then the UE can perform any one or more of the following operations: (1) If the UE generates a recommended bit rate query, it may not include the direction, PDU session, or QoS flow, or DRB, or LCH that cannot perform codec adaptation; (2) If the UE generates a recommended bit rate query, it may not exceed the bit rate adjustment range indicated by gNB.

Example 2 for Solution 1.1

Figure 4:
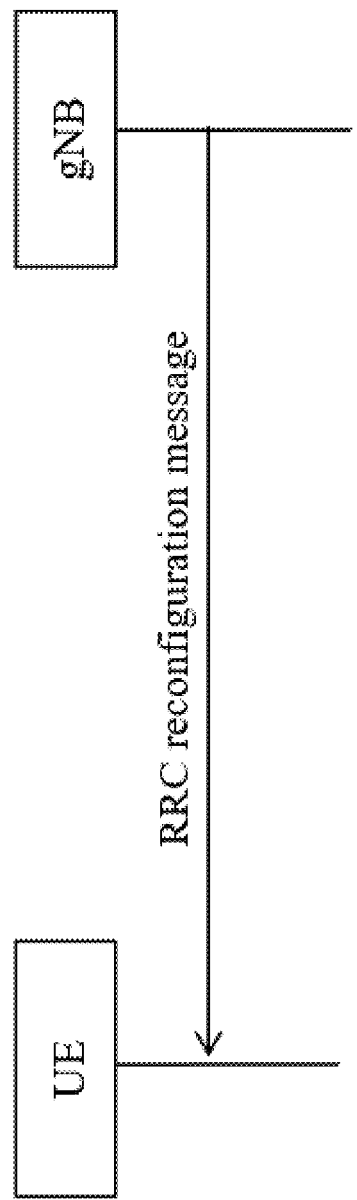
FIG. 4 shows another example of a UE receiving codec adaptation control information from a RAN node.

FIG. 4 shows another example of a UE receiving codec adaptation control information from a RAN node. The gNB may send to a UE the codec adaptation control information included in a RRC reconfiguration message. The gNB can perform codec adaptation control on a single UE. In the 3GPP system, the configuration information can be sent to a specific UE through an RRC message or a MAC CE, and the codec adaptation control information can be carried therein.

The form of the codec adaptation control information for a single UE can include a finer-grained control information, including any one or more of the following (in addition to the fine-grained control information described in Example 1 of Solution 1.1): (1) one indication to indicate UE enable or disable codec adaptation; (2) an indication as to whether the UE can enable uplink or downlink codec adaptation; (3) one or more PDU sessions, or one or more QoS flow, or one or more DRB, or a LCH that can enable or disable codec adaptation; (4) codec adaptation bit rate adjustment range; and/or (5) codec adaptation control time window.

The UE can obtain the codec adaptation control information, and the UE can perform the operations discussed next. According to the information discussed above, if the RAN node does not support codec adaptation, or the RAN node does not allow the UE to enable codec adaptation, the UE can perform any one or more of the following operations: (1) the UE may not send a recommended bit rate query to the RAN node if the recommended bit rate query has been generated; (2) the UE may not generate a recommended bit rate query for the corresponding RAN node.

Further, the UE can inform the second communication node, such as another UE or an MGW, of the RAN node's codec adaptation control information. In some embodiments, the notification method used by the UE can include the UE using NAS layer signaling to send the codec adaptation control information to the second communication node. The NAS layer signaling is forwarded to the second communication node through the core network. In some embodiments, the notification method may include the UE using an application layer to send the codec adaptation control information to the second communication node.

If the information acquired by the UE from the RAN node further includes a time window of the RAN node supporting or not supporting codec adaptation, or a time window within which the UE's codec adaptation function is enabled or disabled, the UE within the time window may perform one or more operations as described above in Example 2 for Solution 1.1. If the information acquired by the UE from the RAN node is fine-grained control information for codec adaptation, for example, if the direction in which the codec adaptation cannot be performed (e.g., uplink or downlink) is indicated in the control information of the codec adaptation, or one or more PDU sessions are performed, or QoS flow, or DRB, or LCH, the UE may perform one or more of the following one or more operations: (1) If the UE generates a recommended bit rate query, the query may not include the direction, PDU session, or QoS flow, or DRB, or LCH that cannot perform codec adaptation; or (2) If the UE generates a recommended bit rate query, the recommended bit rate may not exceed the bit rate adjustment range indicated by gNB.

Solution 1.2: UE Sends Information to RAN Node:

In some embodiments, if a first communication node such as a UE acquires the request information of codec adaptation, e.g. via application layer, from a second communication node, such as a second UE or an MGW, then the first communication node can send the request information of the codec adaptation to its serving RAN node to which the first communication node is wirelessly connected to assist the serving RAN node in deciding how to perform local codec adaptation. The first and second communication nodes may include a user equipment or an MGW, and the first network node may include a RAN node, such as a gNB.

Example for Solution 1.2

Figure 5:
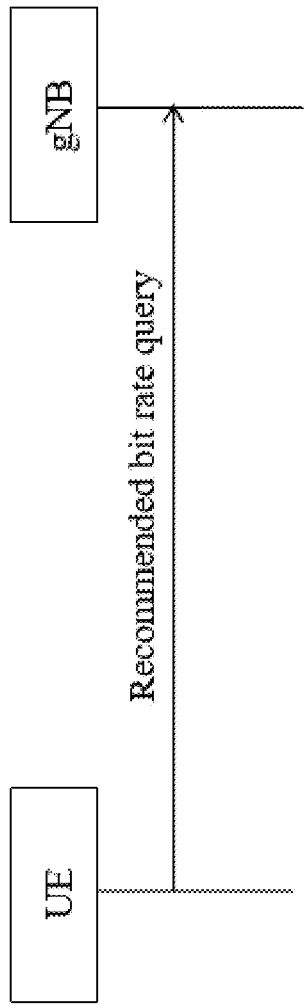
FIG. 5 shows an example of a UE sending control information to a RAN node.

FIG. 5 shows an example of a UE sending request information to a RAN node serving the UE. The UE is in communication with a second communication node (not shown in FIG. 5). If the UE obtains from a second communication node a request information of codec adaptation delivered by the RAN node connected to the second communication node, then the UE can send to its serving RAN node to which the UE is connected a recommended bit rate query. The recommended bit rate query may include the request information of the codec adaptation sent by the second communication node. With the received request information, the serving RAN node can determine how to perform local codec adaptation.

2. Control Mechanism Between Centralized Unit (CU) and Distributed Unit (DU) for Codec Adaptation Section 2 provides solutions for avoiding repeated implementation of codec adaptation and other coverage enhancement schemes, for example, by having a higher layer of the RAN node interact with a MAC layer of the RAN node. There is a need for interactive control and reporting of codec adaptation between CUs and DUs in the architecture where the CU and DU are separated. In an architecture where a CU and a DU are separated, the operations describe in the following solutions in Section 2 can be performed between a CU and a DU.

Solution 2.1: CU Send to DU Codec Adaptation Control Information

The codec adaptation control information includes one of the following information:

(1) whether to enable the DU to support codec adaptation, when DU is not allowed to support the codec adaptation, the DU may not generate and send recommended bit rate adjustment information for any connected UE; or (2) whether to allow DU to enable codec adaptation for a given UE. When not enabled, DU cannot generate and send recommended bit rate adjustment information for the given UE.

Further, the codec adaptation control information sent by the CU to the DU may include whether or not the DU can provide recommended bit rate which may not meet the Qos requirement of the UE. Some examples of a recommended bit rate not meeting the Qos requirement may include the UE receiving from the DU a recommended bit rate of a bearer or a Qos flow or a LCH that is lower than the guaranteed bit rate (GBR) requirement of the bearer or Qos flow or LCH, or the UE receiving from the DU a recommended bit rate of a bearer or a Qos flow that is higher than the maximum bit rate (MBR) requirement of the bearer or Qos flow or LCH.

In some embodiments, the codec adaptation control information that may be obtained by the UE from the DU may tell the UE whether or not the UE is allowed to send a recommended bit rate query to the DU in some cases. For example, the codec adaptation control information may inform the UE that the UE can send to a DU a recommended bit rate query that may not meet the Qos requirements of one or more bearers. Another example may be that the UE can send to a DU a recommended bit rate query that is not able to meet Qos flows or LCHs of the UE.

Optionally, the CU can also send to the DU a time window within which the codec adaptation is to be enabled or disabled. The DU can use the recommended bit rate information to inform the UE that the RAN needs to adjust the code rate of certain logical channels.

Further, the codec adaptation control information sent by the CU to the DU may specify whether codec adaptation is enable or disable per transmission direction (e.g., uplink or downlink). That is, whether to enable DU to enable uplink or downlink codec adaptation per transmission direction, or whether to enable the codec adaptation of the uplink or downlink of the given UE per transmission direction.

In some embodiments, the codec adaptation control information sent by the CU to the DU may include fine-grained control information, including whether the codec adaptation is enabled or disable for any one or more of the following: per one or more PDU sessions, or per one or more QoS flow, per one or more DRBs, or per one or more LCHs. With the fine-grained control information, the DU can determine which PDU sessions, QoS flows, or DRBs, or LCHs of the UE are allowed or disallowed to perform codec adaptation.

In some embodiments, the codec adaptation control information sent by the CU to the DU may include a target code rate or a target code rate range of the codec adjusted per UE, per one or more PDU sessions, per one or more Qos flow, per one or more DRBs, or one or more per LCHs. In some embodiments, the codec adaptation control information sent by the CU to the DU may also include a time window of codec adaptation control.

Example for Solution 2.1

Figure 6:
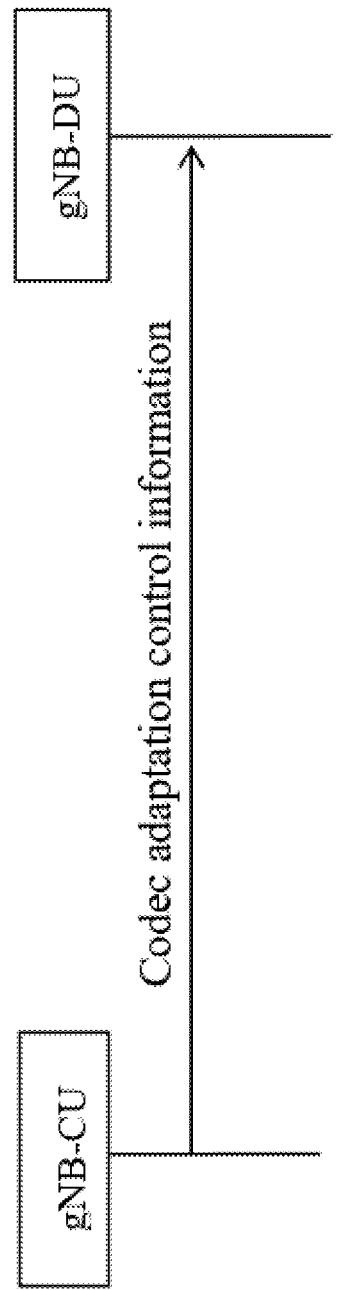
FIG. 6 shows an example of a Centralized Unit (CU) sending codec adaptation control information to a Distributed Unit (DU).

FIG. 6 shows an example of a gNB associated with a CU sending codec adaptation control information to a gNB associated with a DU. As mentioned above, Section 2 describes CU as separate from DU. The content of the codec adaptation control information may include one of the following: (1) Indication whether the DU is enabled or disabled to perform codec adaptation. When not enabled, the DU cannot generate and send recommended bit rate adjustment information for any connected UE. Optionally, the CU can also send or enable the codec adaptation to the DU. Functional time window; or (2) indication whether the DU is allowed to enable codec adaptation for a given UE. When not enabled, DU cannot generate and send recommended bit rate adjustment information for the given UE.

Further, the codec adaptation control information sent by the CU to the DU may specify that the per-user codec adaptation of the given UE be enabled or disabled. In some embodiments, the codec adaptation control information may indicate whether to allow DU to enable uplink or downlink codec adaptation, or whether or not codec adaptation is enabled for an uplink or an downlink of a given UE, or whether codec adaptation of the given UE is enabled.

Further, the codec adaptation control information for the given UE sent from the CU to the DU may have fine-grained control information that may include the control granularity of codec adaptation per PDU session, or per Qos flow, or per DRB, or per LCH. Using this information, the CU can determine for which PDU sessions, or QoS flows, or DRB, or LCH is codec adaptation allowed or disallowed for a UE. In some embodiments, the fine-grained control information may include the codec adaptation recommended bit rate or recommended bit rate range per UE, per PDU session, or per Qos flow, or per DRB, or per LCH. In some embodiments, the fine-grained control information may include codec adaptation control effective time window.

The flow of the codec adaptation control information can be as follows: the CU can send the codec adaptation control information to the DU in the process of establishing an F1 interface with the DU. The CU can send the codec adaptation control information for a given UE to the DU in the process of establishing the RRC connection for a given UE. The CU can send the codec adaptation control information for a given UE to the DU during bearer establish. CU can also send the codec adaptation control information to DU in any signaling procedure involving CU to DU.

Because the codec adaptation control information is changed according to the wireless air interface communication quality, DU load, CN load dynamic condition or additional factors, the codec adaptation control information belongs to the dynamic configuration control information, in order to enhance its dynamicity, it can be used in any CU to DU signaling.

Solution 2.2: DU Sends to CU Codec Adaptation Request Information:

If a first network element, such as a DU determines whether or not to perform codec adaptation, the first network element can send a codec adaptation request message to a second network element, such as a CU to enable or disable codec adaptation. The codec adaptation request message may be per DU or for a given UE.

In some embodiments, if the DU generates the recommended bit rate information for a given UE or sends the recommended bit rate information to the UE, the DU may inform the CU that the DU has implemented codec adaptation for the UE. For example, this information may be sent in the request message. CU can decide based on this whether it may implement other coverage enhancement mechanisms for the UE.

Further, the codec adaptation request message sent by the DU to the CU may request any one or more of the following: per direction (e.g., uplink or downlink) codec adaptation to be enabled or disabled for the DU, or per direction (e.g., uplink or downlink) codec adaptation to be enabled or disabled for a given communication node, such as a UE. In some embodiments, if codec adaption is indicated to be enabled or disabled in the request message, then the receiving node is required to enable or disable codec adaptation.

In some embodiments, the codec adaptation request message sent by the DU to the CU may include fine-grained control information, including whether the codec adaptation is enabled or disabled for any one or more of the following for a UE: per one or more PDU sessions, per one or more QoS flow, per one or more DRB, or per one or more LCHs. Using fine-grained control information, the CU can determine which PDU sessions or QoS flows or DRBs or LCH are codec adaptation enabled or disabled for a UE.

In some embodiments, the DU may also include in the codec adaptation request message the target codec rate or a target codec rate range of any one or more of per-UE, per PDU session, or per QoS flow, or per DRB, or per LCH as recommended by DU.

In some embodiments, the codec adaptation request information that the DU sends to the CU may also include a time window for the codec adaptation control request to take effect. The time window may indicate the times when the codec adaption is to be enabled or disabled. In some embodiments, if codec adaption is indicated to be enabled or disabled within a time window in the request message, then the receiving node is required to enable or disable codec adaptation within the time window.

In some embodiments, if the DU receives the recommended bit rate query from the UE that indicates that the UE wants to perform codec adaptation using a recommended bit rate, the DU sends request information to the CU by including the recommended bit rate query of the UE.

Optionally, in some embodiments, the recommended bit rate query may be directly forwarded by the DU to the CU, or the DU forwards the recommended bit rate query to the CU by remapping the LCHs in the recommended bit rate query into corresponding DRBs or Qos flows or PDU sessions.

Example 1 for Solution 2.2

Figure 7:
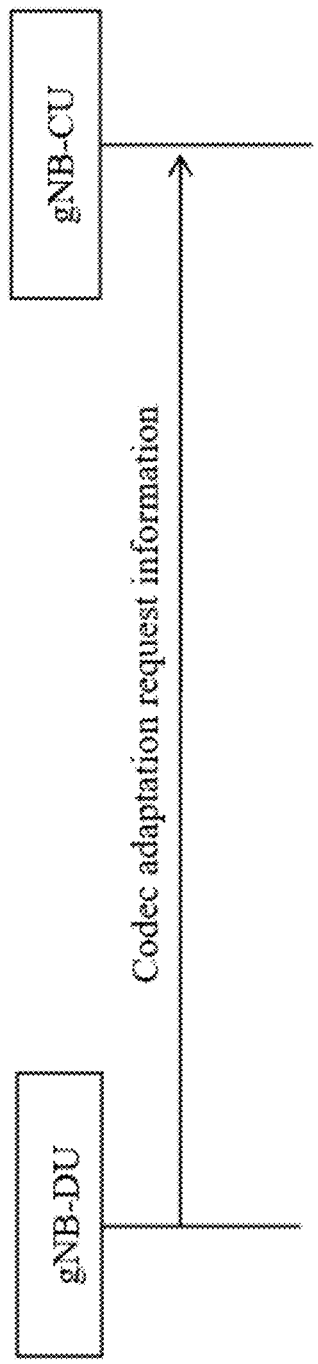
FIG. 7 shows an example of a DU sending codec adaptation control request information to a CU.

FIG. 7 shows an example of a DU sending codec adaptation control request information to a CU. The content of the codec adaptation request info may include one of the following information. If the DU wants or does not want to perform codec adaptation, the DU can send in the request information to the CU an indication to enable or disable codec adaptation, respectively. The request information can be per DU. Thus, the DU can determine whether the DU wants to support or does not support for all UEs to perform codec adaptation or for a given UE to perform codec adaptation. Further, the codec adaptation request information can include an indication to enable or disable codec adaptation per direction (e.g., uplink or downlink). Further, the codec adaptation request information can be per UE.

In some embodiments, the codec adaptation request information sent by the DU to the CU may have fine-grained control request information for a UE, including codec adaptation per PDU session, or per QoS flow, or per DRB, or per LCH. With this information, the CU can determine which PDU sessions, or QoS flows, or DRBs, or LCHs are enabled or disabled for codec adaptation for a UE. In some embodiments, the codec adaptation request information also includes target code rate or target code rate range of per-UE, per PDU session, or per Qos flow, or per DRB, or per LCH as recommended by DU. In some embodiments, the codec adaptation request information also includes the time window for codec adaptation control to take effect.

In some embodiments, an example of the process sent by the codec adaptation request information can be as follows. The DU can send the codec adaptation request information to the CU in the process of establishing an F1 interface with the CU. The DU can send the codec adaptation request information for a given UE to the CU during the establishment of an RRC connection for a given UE. The DU can send the codec adaptation request information for a given UE to the CU during the bearer establish process. The DU can also send the codec adaptation request information to the CU in any signaling procedure involving DU to CU.

Example 2 for Solution 2.2

Figure 8:
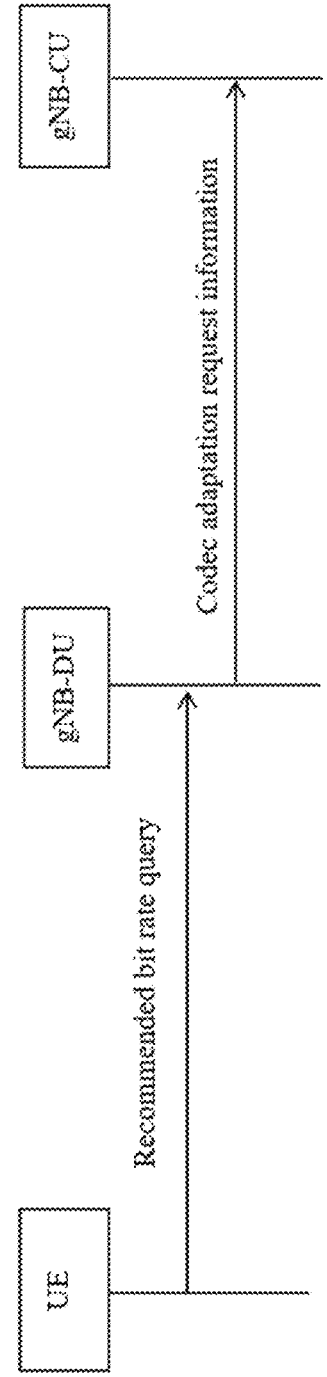
FIG. 8 shows another example of a DU sending codec adaptation control request information to a CU.

FIG. 8 shows another example of a DU sending codec adaptation control request information to a CU. If the DU receives the requested bit rate query information from the UE side indicating that the UE wishes to perform codec adaptation and may include the requirement of the UE to obtain codec adaptation from the second communication node, the DU may send a codec adaptation request message to the CU to confirm whether it can support the information included in the UE's recommended bit rate query. In some embodiments, the recommended bit rate query received by the DU may include codec adaptation requirement from a second communication node with which the UE is in communication. Optionally, the recommended bit rate query may be forwarded by the DU to the CU as part of the codec adaptation request message, or the DU remaps the LCHs in the recommended bit rate query into corresponding DRBs or Qos flows, or PDU session and then forwards the recommended bit rate query to the CU.

Example 3 for Solution 2.2

In some embodiments, if the DU generates a recommended bit rate information for a given UE or sends a recommended bit rate information to the UE, the DU may inform the CU that the DU has implemented codec adaptation for the UE. Based on the information received by the CU, the CU can determine whether it is can implement other coverage enhancement mechanisms for the UE. The process used for Example 3 of Solution 2.2 can be the same as the flowchart show in FIG. 7.

3. Control Mechanism Between RAN and CN for Codec Adaptation

Section 3 provides solutions for services that support codec adaptation. In the current network architecture, only the core network and the UE may know which services support codec adaptation, which the RAN cannot know. In some cases, only the core network knows which services support codec adaptation that neither the UE nor the RAN knows.

In some embodiment related to Section 3, a network node, such as a RAN node can obtain a support service type information of the codec adaptation of the given UE from the CN or from the UE. The UE may obtain the service type information of the codec adaptation of the UE from the CN.

The support service type information of the codec adaptation of the UE can include information such as the identity of the one or more PDU sessions of the UE or the identity of the one or more QoS flows that support codec adaptation. In some embodiments, the support service type information can include a bit rate adjustment range of codec adaptation supported by a PDU session or a QoS flow.

In embodiments where the RAN node obtains the support service type information from the CN, the RAN node can obtain the support service type information during the process of establishing a connection between a given UE and the RAN node and the CN. In some embodiments, the RAN node can obtain the support service type information from the CN when the CN requests the RAN node to modify the PDU session or QoS flow of the given UE.

In embodiments where the RAN node obtains the support service type information from the UE, the RAN node can obtain the support service type information during the process of establishing a connection between a given UE and the RAN node and the CN. In some embodiments, In embodiments where the UE obtains the support service type information from the CN, the UE can obtain the support service type information during the process of establishing a NAS connection between the UE and the CN. In some embodiments, the UE can obtain the support service type information from the CN during the PDU session establishment between the UE and the CN.

Example 1 for Section 3

During the process of establishing a connection between the UE and the network, the RAN node, the CN, and the UE may exchange some information. During the process of establishing a connection, the CN may send codec adaptation support service type information to the RAN. The communication node, such as the UE, can transmit the supported service type information of the codec adaptation to the RAN node. Alternatively, when the UE itself does not have the service type information of codec adaptation, the CN may send the UE's codec adaptation support service type information to the UE in the process of establishing a connection between the UE and the CN.

The support service type information of the codec adaptation of the UE can include the one or more PDU sessions of the UE or the one or more QoS flows that support codec adaptation. In some embodiments, support service type information of the codec adaptation of the UE can also include a tunable range of codec adaptation supported by the PDU session or Qos flow.

Figure 9:
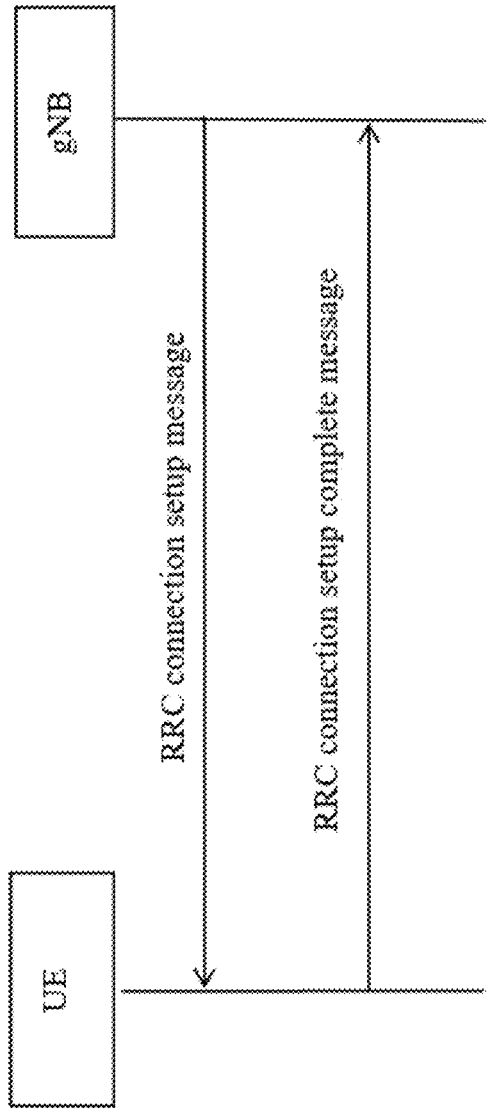
FIG. 9 shows an example of a UE establishing a connection with a network node.

FIG. 9 shows an example of a UE establishing a connection with a network node, such as a gNB. In Example 1 of Section 3, the UE stores its own service type information for codec adaptation. Under this example scenario, the UE can adapt its own type of codec adaptation service in the process of establishing an RRC connection between the UE and the RAN node. As shown in FIG. 9, the UE can send to the gNB the support service type information of codec adaptation of the UE using the RRC connection setup complete message. This message may be sent by UE in response to the RRC connection setup message sent by the gNB. In some embodiments, other RRC signaling from UE to gNB may also be used to carry support service type information of codec adaptation of the UE.

Figure 10:
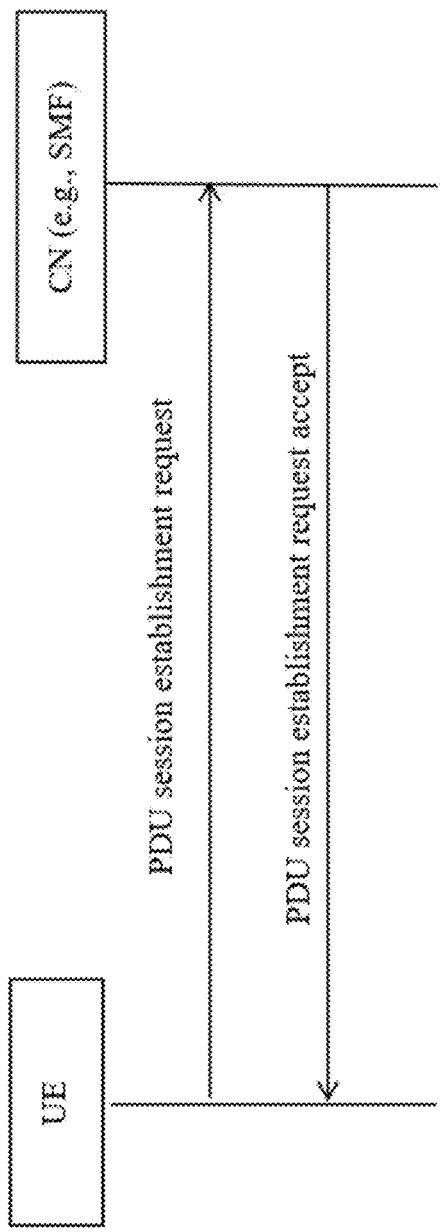
FIG. 10 shows an example of a UE requesting a service type information for codec adaptation from a network node.

FIG. 10 shows an example of a UE obtaining a service type information for codec adaptation from a network node, such as a CN. In embodiments related to FIG. 10, the UE may not store its own service type information for codec adaptation. In the process where the UE uses a PDU session establishment request to request one or more PDU sessions from the core network element, such as a session management function (SMF), the CN can provide feedback. The CN can send the UE's corresponding codec adaptation service type information to the UE in a feedback signal, such as in a PDU session establishment request accept message. In some embodiments, the CN can send other signaling to the UE to carry the support service type information of the codec adaptation of the UE.

Figure 11:
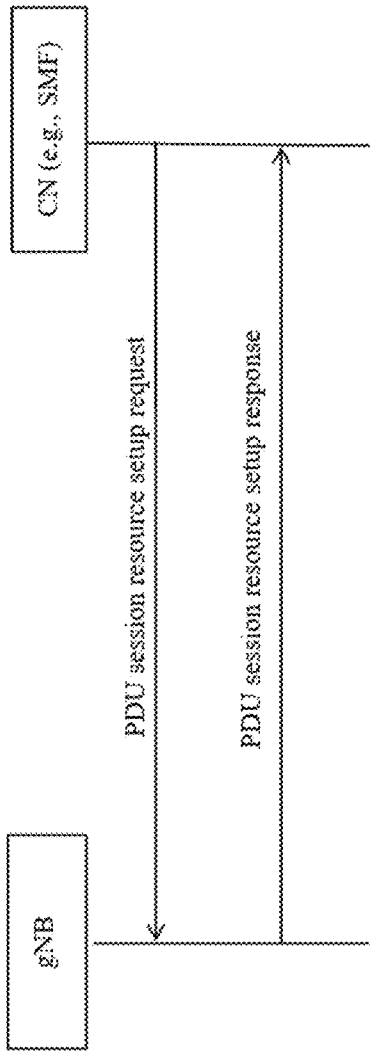
FIG. 11 shows an example of a first network node requesting a service type information for codec adaptation from a second network node.

FIG. 11 shows an example of a first network node, such as a CN sending a service type information for codec adaptation to a second network node, such as a gNB. In FIG. 10, a network element of the CN, such as an SMF, can send a PDU session resource setup request message for a given UE to a gNB. The request message sent by the CN may carry the codec adaptation support service information of the UE to the gNB. In some embodiments, other signaling can be used by CN to send to the gNB the codec adaptation support service type information of the UE.

4. Prioritized Control Information

Codec adaptation and other coverage enhancement schemes, such as duplication, coverage enhancement (CE) mode, etc., can achieve similar coverage enhancements at different costs. In Section 4 different coverage enhancement schemes are described that can have priority for implementation. The higher layer can set policies for the medium access control (MAC) layer and prioritize which solutions to implement. This type of policy may be affected by the network load or service type. Dynamic configuration can be implemented where policy priorities may be different in different situations.

In embodiments involving a separate CU and DU architecture, the following operations can be performed by the CU and/or DU. The CU can indicate to the DU a plurality of priorities of the coverage enhancement mechanism that can include a priority of the codec adaptation function relative to one or more priorities of one or more other coverage enhancements. The priority indication of the coverage enhancement mechanism may be for the entire DU so that the DU can perform the same priority indication for one or more connected UEs. In some embodiments, the priority of the coverage enhancement mechanism indication may be per communication node, such as a UE so that the DU can perform the priority indication for the given UE.

In embodiments involving a dual connectivity architecture the MN can send the priority of the coverage enhancement mechanism indication for a given UE to the SN where the priority of the codec adaptation function can be higher or lower than one or more priorities of one or more other coverage enhancement schemes.

In embodiments involving communication between RAN node and the UE, the RAN node can send to UE the priority information which include the priorities of one or more coverage enhancement schemes that may include a priority of a codec adaptation function relative to one or more priorities of one or more other coverage enhancements. When the UE side meets the trigger conditions for multiple coverage enhancement schemes at the same time, the UE can determine to prioritize which coverage enhancement according to the execution priority.

The coverage enhancement scheme can include dual connection, carrier aggregation duplication, dual connection duplication, bundling, repetition in time zone (e.g., in frame), handover, Pcell or Scell change, codec adaptation, etc.

The priority indication of the coverage enhancement mechanism can include one of the following implementation examples. As a first example, a network node can only indicate whether the codec adaptation function has high priority. Table 1 shows a second example of a priority indication of a coverage enhancement mechanism. As shown in Table 1 below, the network node can include several coverage enhancements with a priority level.

TABLE 1

| Coverage enhancement mechanism | Priority level |
| --- | --- |
| Codec adaptation | 1 |
| CE mode | 2 |
| PDCP duplication | 3 |

In a third example, as shown in Table 2 below, the network node can include several coverage enhancement scenarios and give the ordering of triggering conditions. The measurement result can include, for example reference signal received power (RSRP) or reference signal received quality (RSRQ).

TABLE 2

| Coverage enhancement mechanism | Measurement result |
| --- | --- |
| Codec adaptation | RSRQ range 1 |
| Configuring dual connection | RSRQ range 2 |
| Handover | RSRQ range 3 |

5. Handover Process

One of the issues address by the solutions in Section 5 is whether during the handover (HO) process the target gNB should obtain the old recommended bit rate or the old recommended bit rate query.

In some embodiments during the HO process, the first network element, such as a source gNB can send to the second network element, such as a target gNB, information that may include a recommended bit rate information recently generated for or sent to the UE that is being handed over, or the most recently received recommended bit rate query information by the source gNB from the UE to be handed over. In some embodiments, the information sent by the first network element to the second network element may be sent through a handover request message during handover.

Figure 12:
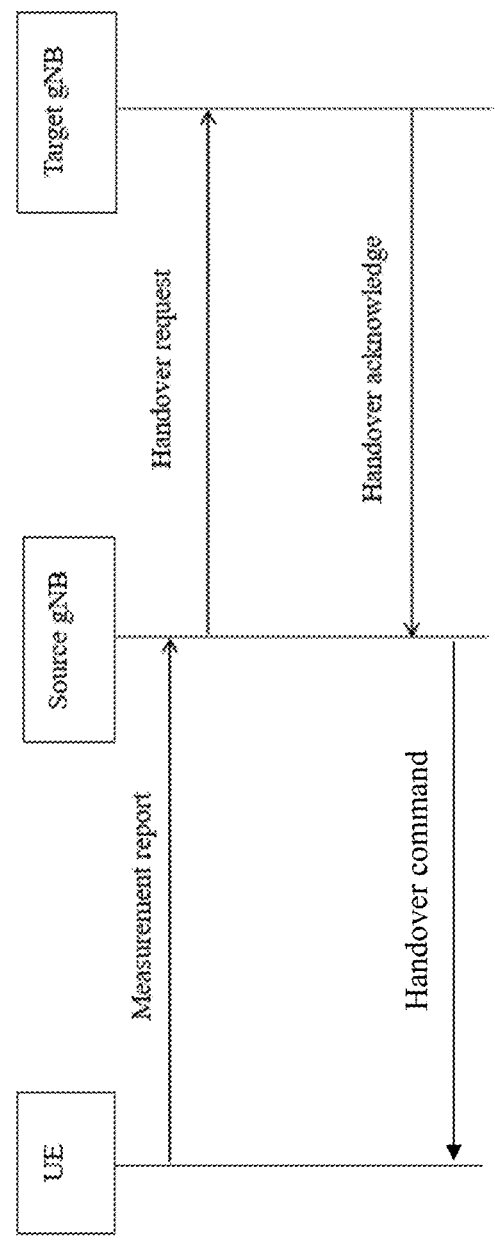
FIG. 12 shows an example of a flowchart for a handover process.

FIG. 12 shows an example of a flowchart for a handover process. First, a communication node such as a UE sends a measurement report to a first network node such as a Source gNB. Based on the measurement report, the source gNB may determine whether to perform a handover. If the source gNB determines to perform a handover, the source gNB may send a handover request to a second network node, such as a target gNB. The handover request may include the last received recommended bit rate query information from the UE and/or the last generated recommended bit rate. Next, the target gNB can send a handover acknowledge message to the source gNB, in which the target gNB can respond whether the received recommended bit rate or recommended bit rate query in the handover request message can be accepted or need to be modified, further the modified recommended bit rate generated by the target gNB can be included also in the handover acknowledge message sent to the source gNB, the source gNB can deliver it to the UE in, e.g. handover command message.

6. Control Mechanism Between MN and SN for Codec Adaptation

As mentioned above, a dual-connection architecture can include a UE establishing a connection with the Master RAN Node (MN) and Secondary RAN Node (SN) at the same time. The MN may control the SN's codec adaptation. In some embodiments, the MN may send codec adaptation control information to the SN. In some embodiments, the MN may send the codec adaptation control information the SN in response to the SN requesting the codec adaptation function from the MN.

The method for sending, receiving, and processing the codec adaptation control information is similar to the architecture in which the CU or DU is separated in a single connection. The MN and SN can be considered the two network elements where the MN can perform operations described for the CU in Section 2 and the secondary node can perform operations described for the DU in Section 2. As mentioned above, the DU and CU can also can be seen as the first and second network elements, respectively. The difference between the two lies in the difference of the interface protocol. In the 3GPP protocol, the interface between the MN and the SN is the Xn interface, and the interface between the CU and DU is the F1 interface.

The MN/SN method is similar to the above Solution 2 (CU/DU), namely: (1) MN indicates to SN a codec adaptation control information, and/or (2) SN indicates to MN a codec adaptation request information.

Figure 13:
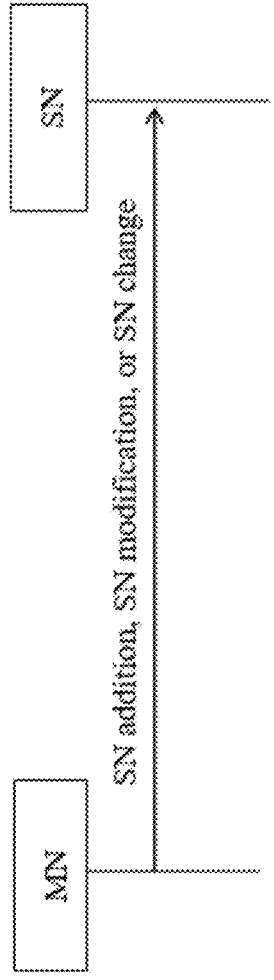
FIG. 13 is an example of a process used by a master node (SN) to send a codec adaptation control information to a secondary node (SN).

FIG. 13 is an example of a process used by a master node to send a codec adaptation control information to a secondary node. The MN may send to the SN a SN addition or SN modification or SN change request that may include codec adaptation control information. The content of the codec adaptation control information may include any one or more of the following:

(1) whether the SN is allowed to enable codec adaptation for a given UE. When not enabled, the SN may not generate and send recommended bit rate adjustment information for the given UE.

(2) whether codec adaptation is enable or disable per direction (e.g., uplink or downlink) for a given UE.

In some embodiments, the codec adaptation control information sent by the MN to the SN may include whether or not the SN can provide recommended bit rate which may not meet the Qos requirement of the UE. Some examples of a recommended bit rate not meeting the Qos requirement may include the UE receiving from the SN a recommended bit rate of a bearer or a Qos flow or a LCH that is lower than the guaranteed bit rate (GBR) requirement of the bearer or Qos flow or LCH, or the UE receiving from the SN a recommended bit rate of a bearer or a Qos flow that is higher than the maximum bit rate (MBR) requirement of the bearer or Qos flow or LCH.

In some embodiments, the codec adaptation control information that may be obtained by the UE from the MN may tell the UE whether or not the UE is allowed to send a recommended bit rate query which may not meet the Qos requirement of the UE to the SN in some cases. For example, the codec adaptation control information may inform the UE that the UE can send to the SN a recommended bit rate query that may not meet the Qos requirements of one or more bearers. Another example may be that the UE can send to the SN a recommended bit rate query that is not able to meet Qos flows or LCHs of the UE.

In some embodiments, the codec adaptation control information for the given UE sent by the MN to the SN may have fine-grained control information, including: codec adaptation per PDU session, or per Qos flow, or per DRB, or per LCH. Using this information, the SN can determine which of the PDU sessions, or QoS flows, or DRB, or LCH is enabled or disabled for codec adaptation. In some embodiments, the fine-grained control information may include recommended bit rate or recommended bit rate range for codec adaptation per UE, or per PDU session, or per Qos flow, or per DRB, or per LCH. In some embodiments, the fine-grained control information may include a codec adaptation control effective time window.

The codec adaptation control information may be sent using any of the following process:
(1) The MN can send the codec adaptation control information to the SN during the process of establishing a dual connection with the SN, such as by using the SN addition process;
(2) The MN can send the codec adaptation control information for a given UE to the SN in the process of modifying the SN, such as by using the SN modification process;
(3) The MN can send the codec adaptation control information for a given UE to the SN in the process of replacing the new SN, such as by using the SN change flow; or
(4) The MN can send the codec adaptation control information to the SN in any signaling procedure involving MN to SN.

Because the codec adaptation control information can change according to the wireless interface's communication quality, the SN's load, or other dynamic conditions, the codec adaptation control information can be dynamically configured. To enhance its dynamicity, the codec adaptation control information can be carried in any message signaled by the MN to SN.

Figure 14:
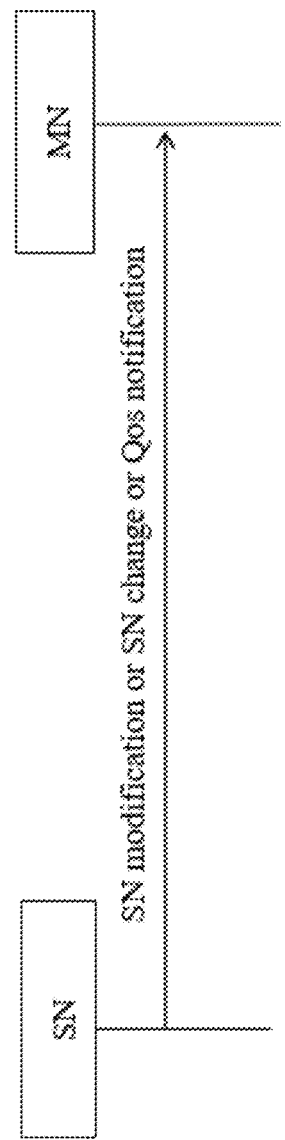
FIG. 14 is an example of a process used to request a codec adaptation control information by the SN from the MN.

FIG. 14 is an example of a process used to request a codec adaptation control information by the SN from the MN. The SN may send to the MN a SN modification request, SN change, or QoS notification message. The SN modification, SN change or QoS notification message may include codec adaptation control information. The content of the codec adaptation control information may include information such as whether the SN wants or does not want to perform codec adaptation. The SN can send a request information to the MN for enabling or disabling codec adaptation for a given UE. In some embodiments, the codec adaptation request information may include a per-direction granularity so that the request can indicate that the uplink or downlink codec adaptation is enabled for a given UE.

In some embodiments, the codec adaptation request information sent by the SN to the MN may have fine-grained control information request that can indicate codec adaptation per PDU session, or per QoS flow, or per DRB, or per LCH. Using this information, the MN can determine which of the PDU sessions, or QoS flows, or DRBs, or LCHs are enabled or disabled for codec adaptation. In some embodiments, the control information request may include the target code rate or target code rate range of per-UE, per PDU session, or per Qos flow, or per DRB, or per LCH as recommended by the SN. In some embodiments, the control information request may include the time window for codec adaptation control to take effect.

The codec adaptation request information may be sent using any of the following process:
(1) The SN may send the codec adaptation request information to the MN as part of the process of requesting SN modification from the MN;
(2) The SN may send the codec adaptation request information to the MN as part of the process of requesting the SN change from the MN;
(3) The SN may send the codec adaptation request information to the MN as part of the process of sending the QoS notification to prompt the MN; or
(4) SN may also send the codec adaptation request information to the MN in any signaling procedure involving SN to MN.

Figure 15:
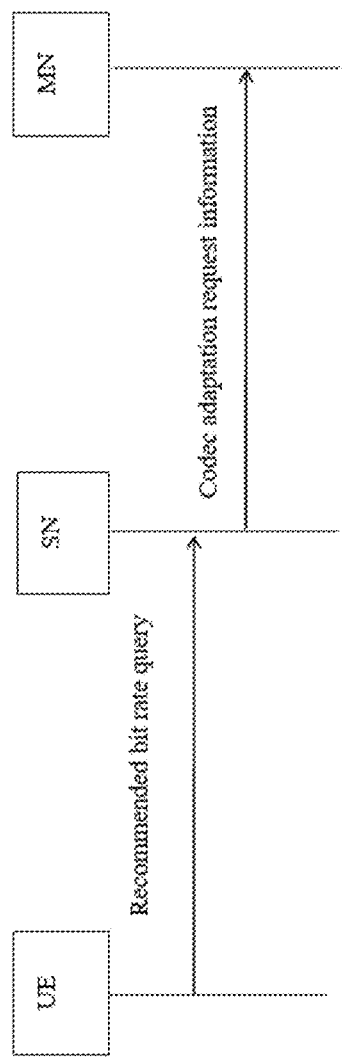
FIG. 15 is another example of a process used to request a codec adaptation control information by the SN from the MN.

FIG. 15 is another example of a process used to request a codec adaptation control information by the SN from the MN. If the SN receives a recommended bit rate query information from the UE side indicating that the UE wishes to perform codec adaptation, the SN may deliver the recommended bit rate information to the MN to confirm whether the MN can support the UE's recommended bit rate query. In some embodiments, the recommended bit rate query information received by the SN may include the request for codec adaptation obtained by the UE from the peer communication node, such as another UE or an MGW. Optionally, the recommended bit rate query may be forwarded by the SN to the MN, or the SN remap the LCHs in the recommended bit rate query into corresponding DRBs or Qos flows, or PDU sessions.

The following description provides another example of a process used to request a codec adaptation control information by the SN from the MN. If the SN generates recommended bit rate information for a given UE or sends a recommended bit rate information to the UE, the SN may inform the MN that the SN has implemented codec adaptation for the UE. The MN can decide based on this whether the MN can implement other coverage enhancement mechanisms for the UE.

Figure 16:
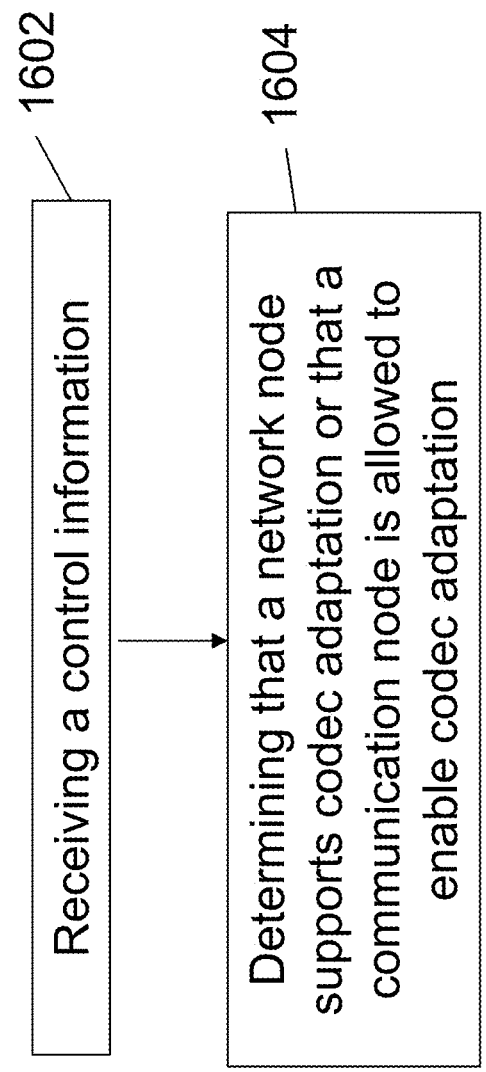
FIG. 16 shows an exemplary flowchart for receiving control information.

FIG. 16 shows an exemplary flowchart for receiving control information. At the receiving operation 1602, a communication node receives a control information from a network node. The control information may include information that indicates that the codec adaptation is enabled or disabled per transmission direction, per one or more packet data unit (PDU) sessions, per one or more quality of service (QoS) flow, per one or more data radio bearer (DRB), or per one or more logical channels (LCH). In some embodiments, the communication node may generate a recommended bit rate query by excluding one or more PDU sessions, one or more QoS flow, one or more DRB, or one or more LCH that cannot perform codec adaptation.

The control information may include information that indicates a bit rate adjustment range for the codec adaptation. In some embodiments, the communication node generates a recommended bit rate query by including a bit rate that does not exceed the bit rate adjustment range. In some embodiments, the control information may include information that indicates that a time window for codec adaptation is supported or not supported by the network node. In some embodiments, the control information may include information that indicates that a time window of the codec adaptation is enabled or disabled for the communication node.

At the determining operation 1604, the communication node determines, based on the control information, that the network node supports codec adaptation or that the communication node is allowed to enable the codec adaptation.

In some embodiments, the process shown in FIG. 16 may further include the communication node determining, based on the received control information, that the network node does not support codec adaptation or that the communication node is not allowed to enable the codec adaptation. In such embodiments, the communication node performs any one or more of following operations: determining that a recommended bit rate query not be sent to the network node, and determining that a recommended bit rate query not be generated.

Figure 17:
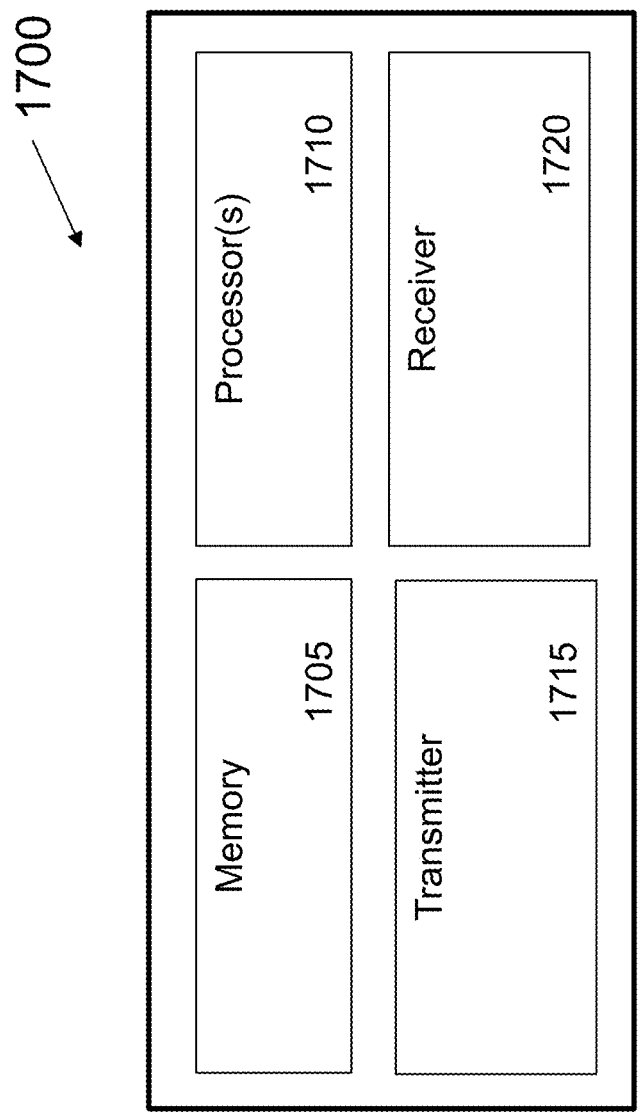
FIG. 17 shows an exemplary block diagram of a communication node or a network node.

FIG. 17 shows an exemplary block diagram of a communication node or a network node 1700. The communication node 1700 can include a user equipment, a mobile device, or a multimedia gateway. The network node 1700 can include a base station, a RAN node, a gNB, a master node in a dual-connectivity system, a secondary node in a dual-connectivity system, a distributed unit, or a centralized unit. The communication or network node 1700 includes at least one processor 1710 and a memory 1705 having instructions stored thereupon. The instructions upon execution by the processor 1710 configure the communication or network node 1700 to perform the operations described in FIG. 16 and in the various embodiments described in this patent document. The transmitter 1715 transmits or sends information or data to another network node or another communication node. The receiver 1720 receives information or data transmitted or sent by another network node or another communication node.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method performed by a communication device, the wireless communication method comprising:
   receiving, by the communication node from a network node, a control information,
      wherein the control information includes information that indicates that a codec adaptation is enabled or disabled per transmission direction, per one or more packet data unit (PDU) sessions, per one or more quality of service (QoS) flow, per one or more data radio bearer (DRB), or per one or more logical channels (LCH);
   determining, based on the control information, that the network node supports the codec adaptation or that the communication node is allowed to enable the codec adaptation; and
   sending, based on the determining, a recommended bit rate query to the network node,
      wherein the recommended bit rate query indicates a bit rate to be provided by the network node, and
      wherein the communication node generates the recommended bit rate query by excluding from the recommended bit rate query one or more PDU sessions, one or more QoS flow, one or more DRB, or one or more LCH that cannot perform codec adaptation.

2. The wireless communication method of claim 1, wherein the control information includes information that indicates a bit rate adjustment range for the codec adaptation.

3. The wireless communication method of claim 2, wherein the communication node generates the recommended bit rate query by including the bit rate that does not exceed the bit rate adjustment range.

4. The wireless communication method of claim 1,
wherein the control information includes information that indicates that a time window for codec adaptation is supported or not supported by the network node, or
wherein the control information includes information that indicates that the time window of the codec adaptation is enabled or disabled for the communication node.

5. A wireless communication method performed by a first network element, the wireless communication method comprising:
receiving, by the first network element from a communication node, a recommended bit rate query that includes a bit rate,
wherein the recommended bit rate query excludes one or more packet data unit (PDU) sessions, one or more quality of service (QoS) flow, one or more data radio bearer (DRB), or one or more logical channels (LCH) that cannot perform codec adaptation; and
sending, by the first network element to a second network element, a request message,
wherein the request message informs the second network element to enable or disable codec adaptation,
wherein the request message includes the bit rate, and
wherein the first network element and the second network element are separate network elements.

6. The wireless communication method of claim 5, wherein the first network node sends to the second network node an indication that that first network node implemented codec adaption for the communication node.

7. The wireless communication method of claim 5, wherein the request message includes information that indicates that the codec adaptation is to be enabled or disabled per transmission direction for the first network element or per transmission direction for the communication node.

8. The wireless communication method of claim 5, wherein the request message includes information that indicates that the codec adaptation is to be enabled or disabled per one or more packet data unit (PDU) session, per one or more quality of service (QoS) flow, per one or more data radio bearer (DRB), or per one or more logical channels (LCH).

9. The wireless communication method of claim 5, wherein the request message includes information that indicates a target code rate or a target code rate range of any one or more of per communication node, per one or more PDU sessions, per one or more Qos flow, per one or more DRB, or per one or more LCH.

10. The wireless communication method of claim 5, wherein the request message includes information that indicates a time window within which codec adaption is to be enabled or disabled.

11. A communication node, comprising:
a processor configured to:
receive, from a network node, a control information,
wherein the control information includes information that indicates that a codec adaptation is enabled or disabled per transmission direction, per one or more packet data unit (PDU) sessions, per one or more quality of service (QoS) flow, per one or more data radio bearer (DRB), or per one or more logical channels (LCH);
determine, based on the control information, that the network node supports the codec adaptation or that the communication node is allowed to enable the codec adaptation; and
send, based on the determine, a recommended bit rate query to the network node,
wherein the recommended bit rate query indicates a bit rate to be provided by the network node, and
wherein the processor of the communication node is configured to generate the recommended bit rate query by excluding from the recommended bit rate query one or more PDU sessions, one or more QoS flow, one or more DRB, or one or more LCH that cannot perform codec adaptation.

12. The communication node of claim 11, wherein the control information includes information that indicates a bit rate adjustment range for the codec adaptation.

13. A first network element, comprising:
a processor configured to:
receive, from a communication node, a recommended bit rate query that includes a bit rate,
wherein the recommended bit rate query excludes one or more packet data unit (PDU) sessions, one or more quality of service (QoS) flow, one or more data radio bearer (DRB), or one or more logical channels (LCH) that cannot perform codec adaptation; and
send, to a second network element, a request message,
wherein the request message informs the second network element to enable or disable codec adaptation,
wherein the request message includes the bit rate, and
wherein the first network element and the second network element are separate network elements.

14. The first network element of claim 13, wherein the processor of the first network node is configured to sends to the second network node an indication that that first network node implemented codec adaption for the communication node.

15. The first network element of claim 13, wherein the request message includes information that indicates that the codec adaptation is to be enabled or disabled per transmission direction for the first network element or per transmission direction for the communication node.

16. The first network element of claim 13, wherein the request message includes information that indicates that the codec adaptation is to be enabled or disabled per one or more packet data unit (PDU) session, per one or more quality of service (QoS) flow, per one or more data radio bearer (DRB), or per one or more logical channels (LCH).

17. The communication node of claim 12, wherein the processor of the communication node is configured to generates the recommended bit rate query by including the bit rate that does not exceed the bit rate adjustment range.

18. The communication node of claim 11,
wherein the control information includes information that indicates that a time window for codec adaptation is supported or not supported by the network node, or
wherein the control information includes information that indicates that the time window of the codec adaptation is enabled or disabled for the communication node.

19. The wireless communication method of claim 5, wherein the recommended bit rate query includes a bit rate that does not exceed a bit rate adjustment range.

20. The first network element of claim 13, wherein the recommended bit rate query includes a bit rate that does not exceed a bit rate adjustment range.

\* \* \* \* \*